United States Patent
Kunikata et al.

(10) Patent No.: US 9,340,718 B2
(45) Date of Patent: *May 17, 2016

(54) LAMINATE AND METHOD OF PRODUCING LAMINATE

(71) Applicant: NITTO DENKO CORPORATION, Ibaraki-shi, Osaka (JP)

(72) Inventors: Satoru Kunikata, Ibaraki (JP); Takashi Kamijo, Ibaraki (JP); Tomohiro Mori, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/169,270

(22) Filed: Jan. 31, 2014

(65) Prior Publication Data

US 2014/0248465 A1    Sep. 4, 2014

(30) Foreign Application Priority Data

Mar. 1, 2013  (JP) .................. 2013-040584

(51) Int. Cl.
*C09K 3/16*   (2006.01)
*G02B 1/10*   (2015.01)
(Continued)

(52) U.S. Cl.
CPC ... *C09K 3/16* (2013.01); *C08J 7/04* (2013.01); *G02B 1/10* (2013.01); *G02B 5/305* (2013.01); *C08J 2367/02* (2013.01); *C08J 2475/04* (2013.01); *Y10T 428/24355* (2015.01)

(58) Field of Classification Search
CPC .............. C09K 3/16; H01B 1/00; H01B 1/04; H01B 1/06; H01B 1/08; G02B 5/305; G02B 1/10; C08J 7/04; C08J 2367/02; C08J 2475/04; Y10T 428/24355
USPC .................................................. 428/141–150
See application file for complete search history.

(56) References Cited

U.S. PATENT DOCUMENTS

| 5,391,472 A | 2/1995 | Muys et al. |
| 6,225,040 B1 | 5/2001 | Muys et al. |

(Continued)

FOREIGN PATENT DOCUMENTS

| CN | 1661395 A | 8/2005 |
| CN | 101506691 A | 8/2009 |

(Continued)

OTHER PUBLICATIONS

Japanese Explanation of Circumstances Concerning Accelerated Examination dated Feb. 4, 2014, issued in corresponding Japanese Patent Application No. 2013-040584 with English translation (8 pages).

(Continued)

*Primary Examiner* — Nathan Van Sell
(74) *Attorney, Agent, or Firm* — Westerman, Hattori, Daniels & Adrian, LLP (57) ABSTRACT

A laminate according to an embodiment of the present invention includes: a resin substrate; a polyvinyl alcohol-based resin layer formed on one side of the resin substrate; and an antistatic layer formed on another side of the resin substrate and comprising a binder resin and a conductive material. The antistatic layer has a fine uneven surface; and the fine uneven surface includes protrusions having an average height of 25 nm or more and a softening temperature of 150° C. or more.

5 Claims, 1 Drawing Sheet

(51) Int. Cl.
*C08J 7/04* (2006.01)
*G02B 5/30* (2006.01)

(56) References Cited

U.S. PATENT DOCUMENTS

| | | | |
|---|---|---|---|
| 8,029,884 | B2 | 10/2011 | Miyazaki et al. |
| 8,314,987 | B2 | 11/2012 | Goto et al. |
| 8,320,042 | B2 | 11/2012 | Goto et al. |
| 8,379,169 | B2 | 2/2013 | Kitagawa et al. |
| 8,411,360 | B2 | 4/2013 | Kitagawa et al. |
| 8,485,673 | B2 | 7/2013 | Furui et al. |
| 8,520,169 | B2 | 8/2013 | Kitagawa et al. |
| 8,520,171 | B2 | 8/2013 | Kitagawa et al. |
| 8,709,567 | B2 | 4/2014 | Kitagawa et al. |
| 8,721,816 | B2 | 5/2014 | Kitagawa et al. |
| 8,771,454 | B2 | 7/2014 | Goto et al. |
| 2006/0047030 | A1 | 3/2006 | Yoshida et al. |
| 2007/0166523 | A1 | 7/2007 | Fukaya et al. |
| 2007/0202297 | A1 | 8/2007 | Takada et al. |
| 2008/0044674 | A1 | 2/2008 | Inoue et al. |
| 2008/0311385 | A1* | 12/2008 | Miyazaki et al. ............. 428/330 |
| 2009/0015926 | A1 | 1/2009 | Iwata et al. |
| 2009/0056589 | A1 | 3/2009 | Guiheen et al. |
| 2009/0142562 | A1* | 6/2009 | Miyagawa et al. ........... 428/212 |
| 2010/0003508 | A1 | 1/2010 | Arrouy et al. |
| 2010/0028693 | A1 | 2/2010 | Okafuji et al. |
| 2010/0035031 | A1* | 2/2010 | Itoh et al. ....................... 428/204 |
| 2010/0097705 | A1* | 4/2010 | Furui et al. .................... 359/599 |
| 2010/0157216 | A1 | 6/2010 | Wada |
| 2011/0268935 | A1 | 11/2011 | Suzuki et al. |
| 2011/0315306 | A1 | 12/2011 | Goto et al. |
| 2012/0003400 | A1 | 1/2012 | Nishimura et al. |
| 2012/0055607 | A1 | 3/2012 | Kitagawa et al. |
| 2012/0055608 | A1 | 3/2012 | Kitagawa et al. |
| 2012/0055621 | A1 | 3/2012 | Goto et al. |
| 2012/0055622 | A1 | 3/2012 | Kitagawa et al. |
| 2012/0055623 | A1 | 3/2012 | Kitagawa et al. |
| 2012/0056211 | A1 | 3/2012 | Kitagawa et al. |
| 2012/0056340 | A1 | 3/2012 | Kitagawa et al. |
| 2012/0057104 | A1 | 3/2012 | Kitagawa et al. |
| 2012/0057107 | A1 | 3/2012 | Kitagawa et al. |
| 2012/0057231 | A1 | 3/2012 | Goto et al. |
| 2012/0057232 | A1 | 3/2012 | Goto et al. |
| 2012/0058291 | A1 | 3/2012 | Kitagawa et al. |
| 2012/0058321 | A1 | 3/2012 | Goto et al. |
| 2012/0315465 | A1 | 12/2012 | Kawasaki et al. |
| 2013/0100529 | A1 | 4/2013 | Kitagawa et al. |
| 2013/0114139 | A1 | 5/2013 | Kitagawa et al. |
| 2013/0128357 | A1 | 5/2013 | Izaki et al. |
| 2013/0299070 | A1 | 11/2013 | Kawamura |
| 2014/0186568 | A1 | 7/2014 | Kitagawa et al. |

FOREIGN PATENT DOCUMENTS

| | | |
|---|---|---|
| CN | 101937113 A | 1/2011 |
| EP | 1253166 A2 | 10/2002 |
| JP | 2001-343521 A | 12/2001 |
| JP | 2007-41598 A | 2/2007 |
| JP | 2010-26523 A | 2/2010 |
| JP | 2010-60643 A | 3/2010 |
| JP | 2011-81399 A | 4/2011 |
| JP | 2012-133303 A | 7/2012 |
| JP | 2012-134117 A | 7/2012 |
| KR | 10-2008-0106864 A | 12/2008 |
| KR | 10-2012-0123328 A | 11/2012 |
| WO | 2009/084832 A2 | 7/2009 |
| WO | 2010/092926 A1 | 8/2010 |
| WO | 2011-125958 A1 | 10/2011 |
| WO | 2012/029937 A1 | 3/2012 |
| WO | 2012/077824 A1 | 6/2012 |

OTHER PUBLICATIONS

Japanese Office Action dated May 21, 2014, issued in corresponding Japanese Patent Application No. 2013-040584 with English translation (16 pages).
Extended European Search Report dated Apr. 24, 2014, issued in European Patent Application No. 14152821.6-1308 (5 pages).
Taiwanese Office Action dated Jan. 27, 2015, issued in corresponding TW Patent Application No. 103103503 with English translation (9 pages).
US Office Action dated Aug. 21, 2014, issued in U.S. Appl. No. 13/970,681 (10 pages).
US Office Action dated Dec. 3, 2014, issued in U.S. Appl. No. 13/970,688 (10 pages).
US Office Action dated Mar. 13, 2014, issued in U.S. Appl. No. 13/970,688 (15 pages).
Office Action dated Sep. 8, 2015, issued in counterpart Chinese Patent Application No. 201410073899.X w/ English translation (12 pages).
Office Action dated Mar. 19, 2015, issued in Korean Patent Application No. 10-2014-0024211, with English translation (19 pages).
U.S. Office Action dated Apr. 21, 2015, issued in U.S. Appl. No. 13/970,681 (16 pages).
U.S. Office Action dated May 22, 2015, issued in U.S. Appl. No. 13/970,688 (15 pages).

* cited by examiner

LAMINATE AND METHOD OF PRODUCING LAMINATE

This application claims priority under 35 U.S.C. Section 119 to Japanese Patent Application No. 2013-40584 filed on Mar. 1, 2013, which is herein incorporated by reference.

BACKGROUND OF THE INVENTION

1. Field of the Invention

The present invention relates to a laminate including an antistatic layer and a polyvinyl alcohol-based resin layer and a method of producing such laminate.

2. Description of the Related Art

A polarizing film is disposed on each of both sides of the liquid crystal cell of a liquid crystal display apparatus as a typical image display apparatus, the disposition being attributable to the image-forming mode of the apparatus. For example, the following method has been proposed as a method of producing the polarizing film (for example, Japanese Patent Application Laid-open No. 2001-343521). A laminate having a resin substrate and a polyvinyl alcohol (PVA)-based resin layer is stretched, and is then immersed in a dyeing liquid so that the polarizing film may be obtained. According to such method, a polarizing film having a small thickness is obtained. Accordingly, the method has been attracting attention because of its potential to contribute to the thinning of a recent liquid crystal display apparatus. However, when the resin substrate is used for producing the polarizing film, a problem of blocking arises in winding a long laminate into a roll shape or in stacking laminates on each other. Thus, there is a demand for an improvement in productivity. In addition, when the resin substrate is used for producing the polarizing film, there arises a problem in that the resin substrate may adhere to a roll in performing roll stretching at high temperature.

SUMMARY OF THE INVENTION

According to one embodiment of the present invention, there is provided a laminate that is excellent in blocking resistance and is prevented from adhering to a heating roll.

A laminate according to an embodiment of the present invention includes: a resin substrate; a polyvinyl alcohol-based resin layer formed on one side of the resin substrate; and an antistatic layer formed on another side of the resin substrate and including a binder resin and a conductive material. The antistatic layer has a fine uneven surface, and the fine uneven surface includes protrusions having an average height of 25 nm or more and a softening temperature of 150° C. or more.

In one embodiment of the present invention, a difference between the softening temperature of the protrusions in the surface of the antistatic layer and a softening temperature of each of portions except for the protrusions in the surface is 70° C. or more.

In one embodiment of the present invention, the antistatic layer is subjected to at least one stretching treatment selected from stretching in a longitudinal direction and stretching in a transverse direction.

In one embodiment of the present invention, the antistatic layer has an arithmetic average surface roughness Ra of 18 nm or more.

In one embodiment of the present invention, the binder resin includes a polyurethane-based resin, and the conductive material comprises a conductive polymer including a polythiophene-based polymer.

In one embodiment of the present invention, the antistatic layer has a surface resistance value of less than $10 \times 10^{13} \Omega/\square$.

According to another aspect of the present invention, a method of producing a laminate is provided. The method includes: forming, on one side of a resin substrate, an antistatic layer with a resin composition comprising a binder resin and a conductive material; forming, on another side of the resin substrate, a polyvinyl alcohol-based resin layer; and stretching the resin substrate. The antistatic layer after the stretching has a fine uneven surface including protrusions having an average height of 25 nm or more and a softening temperature of 150° C. or more.

In one embodiment of the present invention, the stretching of the resin substrate having formed thereon the antistatic layer is performed in a transverse direction; the forming of the polyvinyl alcohol-based resin layer is performed on the resin substrate stretched in the transverse direction; and the stretching of the resin substrate having formed thereon the polyvinyl alcohol-based resin layer is performed in a longitudinal direction.

DETAILED DESCRIPTION OF THE PREFERRED EMBODIMENTS

Embodiments of the present invention are described below. However, the present invention is not limited to these embodiments.

A. Laminate

A-1. Entire Configuration

Figure 1:
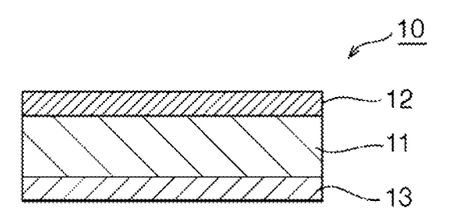
FIG. 1 is a schematic cross-sectional view of a laminate according to a preferred embodiment of the present invention.

FIG. 1 is a schematic cross-sectional view of a laminate according to an embodiment of the present invention. A laminate 10 has a resin substrate 11, a polyvinyl alcohol (PVA)-based resin layer 12 formed on one side of the resin substrate 11, and an antistatic layer 13 formed on the other side of the resin substrate 11. Although not shown, the laminate according to an embodiment of the present invention may have other members (layers) in addition to the resin substrate, the PVA-based resin layer, and the antistatic layer. Examples of the other members (layers) include an optically functional film, a pressure-sensitive adhesive layer, an adhesive layer, and an easy adhesion layer. The laminate 10 is typically formed in a long shape.

The thickness of the laminate according to an embodiment of the present invention is typically 20 μm to 500 μm, which varies depending on its configurations. The respective members are described below.

A-2. Resin Substrate

The resin substrate is typically formed of a thermoplastic resin. Any appropriate resin may be used as the thermoplastic resin. Examples thereof include (meth)acrylic resins, olefin-based resins, norbornene-based resins, and polyester-based resins. Polyester-based resins are preferably used. Of those, an amorphous (uncrystallized) polyethylene terephthalate-based resin is preferably used. In particular, a noncrystalline (hard-to-crystallize) polyethylene terephthalate-based resin is particularly preferably used. Specific examples of the noncrystalline polyethylene terephthalate-based resin include a copolymer further containing isophthalic acid as a dicarboxylic acid component and a copolymer further containing cyclohexane dimethanol as a glycol component.

When an underwater stretching mode is adopted in a stretching treatment to be described later, the preferred resin substrate can absorb water and the water acts as like a plasticizer so that the substrate can plasticize. As a result, a stretching stress can be significantly reduced. Accordingly, the stretching can be performed at a high ratio and the stretchability of the resin substrate can be more excellent than that at the time of in-air stretching. As a result, a polarizing film having excellent optical characteristics can be produced. In one embodiment, the percentage of water absorption of the resin substrate is preferably 0.2% or more, more preferably 0.3% or more. Meanwhile, the percentage of water absorption of the resin substrate is preferably 3.0% or less, more preferably 1.0% or less. The use of such resin substrate can prevent, for example, the following inconvenience: the dimensional stability of the resin substrate remarkably reduces at the time of the production and hence the external appearance of the polarizing film to be obtained deteriorates. In addition, the use of such resin substrate can prevent the rupture of the substrate at the time of the underwater stretching and the peeling of the PVA-based resin layer from the resin substrate. It should be noted that the percentage of water absorption of the resin substrate can be adjusted by, for example, introducing a modification group into the constituent material. The percentage of water absorption is a value determined in conformity with JIS K 7209.

The glass transition temperature (Tg) of the resin substrate is preferably 170° C. or less. The use of such resin substrate can sufficiently secure the stretchability of the laminate while suppressing the crystallization of the PVA-based resin layer. Further, the glass transition temperature is more preferably 120° C. or less in consideration of the plasticization of the resin substrate by water and satisfactory performance of the underwater stretching. In the present invention, even a resin substrate having such glass transition temperature can be prevented from fusing and adhering to a heating roll at the time of stretching by forming a fine uneven surface including protrusions each having a softening temperature equal to or higher than a predetermined value in an antistatic layer to be described later. In one embodiment, the glass transition temperature of the resin substrate is preferably 60° C. or more. The use of such resin substrate prevents an inconvenience such as the deformation of the resin substrate (e.g., the occurrence of unevenness, a slack, or a wrinkle) during the application and drying of an application liquid containing a PVA-based resin, thereby enabling satisfactory production of the laminate. In addition, the use enables satisfactory stretching of the PVA-based resin layer at a suitable temperature (e.g., about 60° C.). In another embodiment, a glass transition temperature lower than 60° C. is permitted as long as the resin substrate does not deform during the application and drying of the application liquid containing the PVA-based resin. It should be noted that the glass transition temperature of the resin substrate can be adjusted by, for example, introducing a modification group into the constituent material or heating the substrate constituted of a crystallizable material. The glass transition temperature (Tg) is a value determined in conformity with JIS K 7121.

The thickness of the resin substrate is preferably 20 μm to 300 μm, more preferably 30 μm to 200 μm.

The resin substrate may be subjected to a surface treatment (e.g., a corona treatment) in advance. This is because the adhesiveness between the resin substrate and the PVA-based resin layer and/or antistatic layer can be improved.

A-3. Polyvinyl Alcohol-Based Resin Layer

Any appropriate resin may be adopted as the polyvinyl alcohol (PVA)-based resin for forming the PVA-based resin layer. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically 85 mol % to 100 mol %, preferably 95.0 mol % to 99.98 mol %, more preferably 99.0 mol % to 99.95 mol %. The saponification degree can be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin may be appropriately selected depending on purposes. The average polymerization degree is typically 1,000 to 10,000, preferably 1,200 to 5,000, more preferably 1,500 to 4,500. It should be noted that the average polymerization degree can be determined in conformity with JIS K 6726-1994.

The PVA-based resin layer is preferably formed after an antistatic layer to be described later has been formed on the resin substrate. The PVA-based resin layer is preferably formed by applying an application liquid containing a PVA-based resin onto the resin substrate and drying the liquid. The application liquid is typically a solution prepared by dissolving the PVA-based resin in a solvent. Examples of the solvent include water, dimethylsulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin of the solution is preferably 3 parts by weight to 20 parts by weight with respect to 100 parts by weight of the solvent. At such resin concentration, a uniform coating film in close contact with the resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive can be used for the purpose of additionally improving the uniformity, dyeing property, or stretchability of the PVA-based resin layer to be obtained.

Any appropriate method may be adopted as a method of applying the application liquid. Examples of the method include a roll coating method, a spin coating method, a wire bar coating method, a dip coating method, a die coating method, a curtain coating method, a spray coating method, and a knife coating method (comma coating method or the like).

The application liquid is applied so that the thickness of the PVA-based resin layer after drying may be preferably 3 μm to 40 μm, more preferably 3 μm to 20 μm. The application liquid is preferably applied and dried at a temperature of 50° C. or more.

The PVA-based resin layer may be an intermediate for a polarizing film (ready to be subjected to a treatment for forming a polarizing film), or may be a polarizing film (ready to be used as a polarizing film).

Examples of the treatment for forming a polarizing film include a dyeing treatment, a stretching treatment, an insolubilizing treatment, a cross-linking treatment, a washing treatment, and a drying treatment. Those treatments may be appropriately selected depending on purposes. Further, the order, timing, number of times, and the like of the treatments may be appropriately set. The respective treatments are described below.

(Dyeing Treatment)

The dyeing treatment is typically performed by dyeing the PVA-based resin layer with iodine. Specifically, the dyeing treatment is performed by causing the PVA-based resin layer to adsorb iodine. A method for the adsorption is, for example, a method involving immersing the PVA-based resin layer (laminate) in a dyeing liquid containing iodine, a method involving applying the dyeing liquid onto the PVA-based resin layer, or a method involving spraying the dyeing liquid on the PVA-based resin layer. Of those, the method involving immersing the laminate in the dyeing liquid is preferred. This is because iodine can satisfactorily adsorb to the layer.

The dyeing liquid is preferably an aqueous solution of iodine. The compounding amount of iodine is preferably 0.01 part by weight to 0.5 part by weight with respect to 100 parts by weight of water. The aqueous solution of iodine is preferably compounded with an iodide in order that the solubility of iodine in water may be increased. Examples of the iodide include potassium iodide, lithium iodide, sodium iodide, zinc iodide, aluminum iodide, lead iodide, copper iodide, barium iodide, calcium iodide, tin iodide, and titanium iodide. Of those, potassium iodide is preferred. The compounding amount of the iodide is preferably 0.02 part by weight to 20 parts by weight, more preferably 0.1 part by weight to 10 parts by weight with respect to 100 parts by weight of water. The liquid temperature of the dyeing liquid at the time of the dyeing is preferably 20° C. to 50° C. in order that the dissolution of the PVA-based resin may be suppressed. When the PVA-based resin layer is immersed in the dyeing liquid, an immersion time is preferably 5 seconds to 5 minutes in order that the transmittance of the PVA-based resin layer may be secured. In addition, the dyeing conditions (the concentration, the liquid temperature, and the immersion time) may be set so that the polarization degree or single axis transmittance of the polarizing film to be finally obtained may fall within a predetermined range. In one embodiment, the immersion time is set so that the polarization degree of the polarizing film to be obtained may be 99.98% or more. In another embodiment, the immersion time is set so that the single axis transmittance of the polarizing film to be obtained may be 40% to 44%.

(Stretching Treatment)

The stretching treatment may be an underwater stretching mode, in which stretching is performed while the laminate is immersed in a stretching bath, or may be an in-air stretching mode. It is preferred that an underwater stretching treatment be performed at least once, and it is more preferred that an underwater stretching treatment and an in-air stretching treatment be performed in combination. According to the underwater stretching, the stretching can be performed at a temperature lower than the glass transition temperature (typically about 80° C.) of each of the thermoplastic resin substrate and the PVA-based resin layer, and hence the PVA-based resin layer can be stretched at a high ratio while its crystallization is suppressed. As a result, a polarizing film having excellent optical characteristics (e.g., polarization degree) can be produced.

Any appropriate method may be adopted as a method of stretching the laminate. Specifically, fixed-end stretching may be adopted, or free-end stretching (e.g., a method involving passing the laminate between rolls having different peripheral speeds to uniaxially stretch the laminate) may be adopted. The stretching of the laminate may be performed in one stage, or may be performed in a plurality of stages. When the stretching is performed in a plurality of stages, the stretching ratio (maximum stretching ratio) of the laminate to be described later is the product of stretching ratios in the respective stages.

Any appropriate direction may be selected as a direction in which the laminate is stretched. In a preferred embodiment, along laminate is stretched in its lengthwise direction.

The stretching temperature of the laminate may be set to any appropriate value depending on, for example, a formation material for the resin substrate and the stretching mode. When the in-air stretching mode is adopted, the stretching temperature is preferably equal to or higher than the glass transition temperature (Tg) of the resin substrate, more preferably Tg+10° C. or more, particularly preferably Tg+15° C. or more. Meanwhile, the stretching temperature of the laminate is preferably 170° C. or less. Performing the stretching at such temperature suppresses rapid progress of the crystallization of the PVA-based resin, thereby enabling the suppression of an inconvenience due to the crystallization (such as the inhibition of the orientation of the PVA-based resin layer by the stretching).

When the underwater stretching mode is adopted as a stretching mode, the liquid temperature of a stretching bath is preferably 40° C. to 85° C., more preferably 50° C. to 85° C. At such temperature, the PVA-based resin layer can be stretched at a high ratio while its dissolution is suppressed. Specifically, as described above, the glass transition temperature (Tg) of the resin substrate is preferably 60° C. or more in relation to the formation of the PVA-based resin layer. In this case, when the stretching temperature falls short of 40° C., there is a possibility that the stretching cannot be satisfactorily performed even in consideration of the plasticization of the resin substrate by water. On the other hand, as the temperature of the stretching bath increases, the solubility of the PVA-based resin layer is raised and hence excellent optical characteristics may not be obtained.

When the underwater stretching mode is adopted, the laminate is preferably stretched while being immersed in an aqueous solution of boric acid (in-boric-acid-solution stretching). The use of the aqueous solution of boric acid as the stretching bath can impart, to the PVA-based resin layer, rigidity enough to withstand a tension to be applied at the time of the stretching and such water resistance that the layer does not dissolve in water. Specifically, boric acid can produce a tetrahydroxyborate anion in the aqueous solution to cross-link with the PVA-based resin through a hydrogen bond. As a result, the PVA-based resin layer can be satisfactorily stretched with the aid of the rigidity and the water resistance imparted thereto, and hence a polarizing film having excellent optical characteristics can be produced.

The aqueous solution of boric acid is preferably obtained by dissolving boric acid and/or a borate in water as a solvent. The concentration of boric acid is preferably 1 part by weight to 10 parts by weight with respect to 100 parts by weight of water. Setting the concentration of boric acid to 1 part by weight or more can effectively suppress the dissolution of the PVA-based resin layer, thereby enabling the production of a polarizing film having additionally high characteristics. It should be noted that an aqueous solution obtained by dissolving a boron compound such as borax, glyoxal, glutaric aldehyde, or the like as well as boric acid or the borate in the solvent may also be used.

The stretching bath (aqueous solution of boric acid) is preferably compounded with an iodide. Compounding the bath with the iodide can suppress the elution of iodine which the PVA-based resin layer has been caused to adsorb. Specific examples of the iodide are as described above. The concentration of the iodide is preferably 0.05 part by weight to 15 parts by weight, more preferably 0.5 part by weight to 8 parts by weight with respect to 100 parts by weight of water.

The laminate is preferably immersed in the stretching bath for a time of 15 seconds to 5 minutes.

The stretching ratio (maximum stretching ratio) of the laminate is preferably 5.0 times or more with respect to the original length of the laminate. Such high stretching ratio can be achieved by adopting, for example, the underwater stretching mode (in-boric-acid-solution stretching). It should be noted that the term "maximum stretching ratio" as used in this specification refers to a stretching ratio immediately before the rupture of the laminate. The stretching ratio at which the laminate ruptures is separately identified and a value lower than the value by 0.2 is the maximum stretching ratio.

The underwater stretching treatment is preferably performed after the dyeing treatment.

(Insolubilizing Treatment)

The insolubilizing treatment is typically performed by immersing the PVA-based resin layer in an aqueous solution of boric acid. Particularly when the underwater stretching mode is adopted, water resistance can be imparted to the PVA-based resin layer by subjecting the layer to the insolubilizing treatment. The concentration of the aqueous solution of boric acid is preferably 1 part by weight to 4 parts by weight with respect to 100 parts by weight of water. The liquid temperature of an insolubilizing bath (the aqueous solution of boric acid) is preferably 20° C. to 50° C. The insolubilizing treatment is preferably performed after the production of the laminate and before the dyeing treatment or the underwater stretching treatment.

(Cross-Linking Treatment)

The cross-linking treatment is typically performed by immersing the PVA-based resin layer in an aqueous solution of boric acid. Water resistance can be imparted to the PVA-based resin layer by subjecting the layer to the cross-linking treatment. The concentration of the aqueous solution of boric acid is preferably 1 part by weight to 4 parts by weight with respect to 100 parts by weight of water. In addition, when the cross-linking treatment is performed after the dyeing treatment, the solution is preferably further compounded with an iodide. Compounding the solution with the iodide can suppress the elution of iodine which the PVA-based resin layer has been caused to adsorb. The compounding amount of the iodide is preferably 1 part by weight to 5 parts by weight with respect to 100 parts by weight of water. Specific examples of the iodide are as described above. The liquid temperature of a cross-linking bath (the aqueous solution of boric acid) is preferably 20° C. to 50° C. The cross-linking treatment is preferably performed before the underwater stretching treatment. In a preferred embodiment, the dyeing treatment, the cross-linking treatment, and the underwater stretching treatment are performed in the stated order.

(Washing Treatment)

The washing treatment is typically performed by immersing the PVA-based resin layer in an aqueous solution of potassium iodide.

(Drying Treatment)

The drying temperature in the drying treatment is preferably 30° C. to 100° C.

The polarizing film is substantially a PVA-based resin layer that adsorbs and orients a dichromatic substance. The thickness of the polarizing film is typically 25 µm or less, preferably 15 µm or less, more preferably 10 µm or less, still more preferably 7 µm or less, particularly preferably 5 µm or less. Meanwhile, the thickness of the polarizing film is preferably 0.5 µm or more, more preferably 1.5 µm or more. The polarizing film preferably shows absorption dichroism at any wavelength in the wavelength range of 380 nm to 780 nm. The single axis transmittance of the polarizing film is preferably 40.0% or more, more preferably 41.0% or more, still more preferably 42.0% or more, particularly preferably 43.0% or more. The polarization degree of the polarizing film is preferably 99.8% or more, more preferably 99.9% or more, still more preferably 99.95% or more.

A-4. Antistatic Layer

The antistatic layer contains a conductive material and a binder resin and has a fine uneven surface. The average height of protrusions in the fine uneven surface is 25 nm or more, preferably 30 nm or more, more preferably 40 nm or more. The softening temperature of the protrusions is 150° C. or more, preferably 180° C. or more, more preferably 200° C. or more. The formation of the protrusions having such average height and softening temperature in the surface of the antistatic layer allows the laminate to be satisfactorily prevented from adhering to a heating roll at the time of stretching. This is probably based on a synergistic effect of the following: a contact area with the roll is small because the surface of the antistatic layer has an uneven shape; and contact portions themselves hardly adhere to the roll because the softening temperature of each of the protrusions is high. In one embodiment, the number of the protrusions that may be formed per unit area (e.g., 100 µm×100 µm) of the antistatic layer is preferably 150 or more, more preferably 200 or more. The formation of the protrusions at such density allows the laminate to be satisfactorily prevented from adhering to a heating roll at the time of stretching. Portions except for the protrusions (hereinafter referred to as "recesses" for the sake of convenience) in the surface of the antistatic layer have a softening temperature of, for example, 80° C. to 145° C. A difference in softening temperature between the protrusions and the recesses is preferably 70° C. or more, more preferably 75° C. to 130° C. It should be noted that the "average height of protrusions" as used herein means a statistical average of differences in height between bottom portions (bottoms of recesses) and vertices of protrusions in a fine uneven surface. The average height of the protrusions and the number of the protrusions per unit area may be measured with an optical 3D profile system (product name: WYKO NT3300) manufactured by Veeco Instruments, Inc. The softening temperature of the protrusions and the recesses may be measured with a scanning probe microscope (product name: NanoNavi II/E-Sweep/nano-TA2) manufactured by Hitachi High-Tech Science Corporation.

The antistatic layer has an arithmetic average surface roughness Ra of preferably 18 nm or more, more preferably 20 nm or more. Excellent blocking resistance can be attained by forming such antistatic layer to impart sliding property. In addition, as described above, the laminate can be satisfactorily prevented from adhering to a heating roll at the time of stretching. On the other hand, the arithmetic average roughness Ra of the antistatic layer is preferably 100 nm or less. When the arithmetic average roughness Ra is more than 100 nm, for example, the optical characteristics of a finished product may be adversely affected. It should be noted that the arithmetic average roughness Ra is defined in JIS B0601.

The thickness of the antistatic layer is preferably 0.1 µm to 10 µm, more preferably 0.2 µm to 2 µm.

A coefficient of static friction between the PVA-based resin layer and the antistatic layer is preferably 2.0 or less, more preferably 1.0 or less. It should be noted that the coefficient of static friction is defined in JIS K7125.

The surface resistance value of the antistatic layer is preferably less than $10 \times 10^{13}$ ohms per square ($\Omega/\square$), more preferably less than $10 \times 10^{11} \Omega/\square$, still more preferably less than $10\times10^{10}$ /□. When the surface resistance value is $10\times10^{13}\Omega$/□ or more, sufficient blocking resistance and antistatic property may not be obtained.

The antistatic layer is preferably transparent. Specifically, the total light transmittance (Tt) of the laminate of the resin substrate and the antistatic layer is preferably 89% or more, more preferably 89.5% or more. Such excellent transparency can be satisfactorily achieved through the use of a conductive polymer as a conductive material to be described later.

Any appropriate conductive material may be used as the conductive material. A conductive polymer is preferably used. The use of the conductive polymer can prevent a reduction in conductivity due to stretching to be described later. Examples of the conductive polymer include a polythiophene-based polymer, a polyacetylene-based polymer, a polydiacetylene-based polymer, a polyyne-based polymer, a polyphenylene-based polymer, a polynaphthalene-based polymer, a polyfluorene-based polymer, a polyanthracene-based polymer, a polypyrene-based polymer, a polyazulene-based polymer, a polypyrrole-based polymer, a polyfuran-based polymer, a polyselenophene-based polymer, a polyisothianaphthene-based polymer, a polyoxadiazole-based polymer, a polyaniline-based polymer, a polythiazyl-based polymer, a polyphenylene vinylene-based polymer, a polythienylene vinylene-based polymer, a polyacene-based polymer, a polyphenanthrene-based polymer, and a polyperinaphthalene-based polymer. They may be used alone or in combination. Of those, a polythiophene-based polymer is preferably used. In particular, there is more preferably used a polythiophene-based polymer capable of being dissolved or dispersed into an aqueous solvent.

Thiophene constituting the polythiophene-based polymer is, for example, polyethylene dioxythiophene.

The content of the conductive material in the antistatic layer is preferably 1 wt % to 10 wt %, more preferably 3 wt % to 8 wt %. Further, the content of the conductive material is preferably 1 part by weight to 50 parts by weight, more preferably 2 parts by weight to 20 parts by weight, with respect to 100 parts by weight of a binder resin to be described later.

A polyurethane-based resin is preferably used as the binder resin. An antistatic layer having both of excellent adhesiveness with a resin substrate and flexibility can be formed through the use of the polyurethane-based resin. Further, the protrusions each having the desired height and softening temperature can be satisfactorily formed through the use of the polyurethane-based resin. Specifically, a coating film having a smooth surface is formed through the use of the polyurethane-based resin, and the coating film can be subjected to a stretching treatment to be described later to form an uneven surface. In addition, the conductive material (typically the polythiophene-based polymer) is included at a relatively high concentration in the protrusions in the uneven surface. Thus, the softening temperature of each of the protrusions can be made higher. As a result, the laminate can be satisfactorily prevented from adhering to a heating roll at the time of stretching. A desired uneven surface (in particular, protrusions each having the desired height and softening temperature) can be satisfactorily formed by appropriately setting the compounding amounts of the binder resin and the conductive material and stretching conditions. In addition, in such uneven surface, excellent antistatic property can be easily achieved.

The polyurethane-based resin refers to a resin having a urethane bond. The polyurethane-based resin includes an acrylic-polyurethane copolymer and a polyester-polyurethane copolymer. The polyurethane-based resin is typically obtained by subjecting a polyol and a polyisocyanate to a reaction. The polyol is not particularly limited as long as two or more hydroxyl groups are contained in its molecule, and any appropriate polyol may be used. Examples thereof include a polyacrylic polyol, a polyester polyol, and a polyether polyol. They may be used alone or in combination.

The polyacrylic polyol is typically obtained by copolymerizing a (meth)acrylic acid ester and a monomer having a hydroxyl group. Examples of the (meth)acrylic acid ester include methyl(meth)acrylate, butyl(meth)acrylate, 2-ethylhexyl(meth)acrylate, and cyclohexyl(meth)acrylate. Examples of the monomer having a hydroxyl group include: (meth)acrylic acid hydroxyalkyl esters such as 2-hydroxyethyl(meth)acrylate, 2-hydroxypropyl(meth)acrylate, 3-hydroxypropyl(meth)acrylate, 2-hydroxybutyl(meth)acrylate, 4-hydroxybutyl(meth)acrylate, and 2-hydroxypentyl(meth)acrylate; (meth)acrylic acid monoesters of polyhydric alcohols such as glycerin and trimethylolpropane; and N-methylol(meth)acrylamide. They may be used alone or in combination.

The polyacrylic polyol may also be obtained by copolymerizing any other monomer in addition to the above-mentioned monomer components. Any appropriate monomer may be used as the other monomer as long as it is copolymerizable. Specific examples thereof include: unsaturated monocarboxylic acids such as (meth)acrylic acid; unsaturated dicarboxylic acids such as maleic acid and anhydrides, monoesters, and diesters thereof; unsaturated nitriles such as (meth)acrylonitrile; unsaturated amides such as (meth)acrylamide and N-methylol(meth)acrylamide; vinyl esters such as vinyl acetate and vinyl propionate; vinyl ethers such as methyl vinyl ether; α-olefins such as ethylene and propylene; halogenated α,β-unsaturated aliphatic monomers such as vinyl chloride and vinylidene chloride; α,β-unsaturated aromatic monomers such as styrene and α-methylstyrene. They may be used alone or in combination.

The polyester polyol is typically obtained by subjecting a polybasic acid component and a polyol component to a reaction. Examples of the polybasic acid component include: aromatic dicarboxylic acids such as orthophthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid; aliphatic dicarboxylic acids such as oxalic acid, succinic acid, malonic acid, glutaric acid, adipic acid, pimelic acid, suberic acid, azelaic acid, sebacic acid, decanedicarboxylic acid, dodecanedicarboxylic acid, octadecanedicarboxylic acid, tartaric acid, an alkylsuccinic acid, linoleic acid, maleic acid, fumaric acid, mesaconic acid, citraconic acid, and itaconic acid; alicyclic dicarboxylic acids such as hexahydrophthalic acid, tetrahydrophthalic acid, 1,3-cyclohexanedicarboxylic acid, and 1,4-cyclohexanedicarboxylic acid; and reactive derivatives thereof such as acid anhydrides, alkyl esters, and acid halides thereof. They may be used alone or in combination.

Examples of the polyol component include ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 1-methyl-1,3-butylene glycol, 2-methyl-1,3-butylene glycol, 1-methyl-1,4-pentylene glycol, 2-methyl-1,4-pentylene glycol, 1,2-dimethyl-neopentyl glycol, 2,3-dimethyl-neopentyl glycol, 1-methyl-1,5-pentylene glycol, 2-methyl-1,5-pentylene glycol, 3-methyl-1,5-pentylene glycol, 1,2-dimethylbutylene glycol, 1,3-dimethylbutylene glycol, 2,3-dimethylbutylene glycol, 1,4-dimethylbutylene glycol, diethylene glycol, triethylene glycol, polyethylene glycol, dipropylene glycol, polypropylene glycol, 1,4-cyclohexanedimethanol, 1,4-cyclohexanediol, bisphenol A, bisphenol F, hydrogenated bisphenol A, and hydrogenated bisphenol F. They may be used alone or in combination.

The polyether polyol is typically obtained by adding an alkylene oxide to a polyhydric alcohol through ring-opening polymerization. Examples of the polyhydric alcohol include ethylene glycol, diethylene glycol, propylene glycol, dipropylene glycol, glycerin, and trimethylolpropane. Examples of the alkylene oxide include ethylene oxide, propylene oxide, butylene oxide, styrene oxide, and tetrahydrofuran. They may be used alone or in combination.

Examples of the polyisocyanate include: aliphatic diisocyanates such as tetramethylene diisocyanate, dodecamethylene diisocyanate, 1,4-butane diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate; alicyclic diisocyanates such as isophorone diisocyanate, hydrogenated xylylene diisocyanate, 4,4'-cyclohexylmethane diisocyanate, 1,4-cyclohexane diisocyanate, methylcyclohexylene diisocyanate, and 1,3-bis(isocyanatomethyl)cyclohexane; aromatic diisocyanates such as tolylene diisocyanate, 2,2'-diphenylmethane diisocyanate, 2,4'-diphenylmethane diisocyanate, 4,4'-diphenylmethane diisocyanate, 4,4'-diphenyldimethylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate; and aromatic aliphatic diisocyanates such as a dialkyldiphenylmethane diisocyanate, a tetraalkyldiphenylmethane diisocyanate, and α,α,α,α-tetramethylxylylene diisocyanate. They may be used alone or in combination.

The polyurethane-based resin preferably has a carboxyl group. When the resin has a carboxyl group, an antistatic layer excellent in adhesiveness with a resin substrate can be obtained. The polyurethane-based resin having a carboxyl group is obtained by, for example, subjecting a chain extender having a free carboxyl group to the reaction in addition to the polyol and the polyisocyanate. Examples of the chain extender having a free carboxyl group include a dihydroxycarboxylic acid and a dihydroxysuccinic acid. Examples of the dihydroxycarboxylic acid include dialkylolalkanoic acids such as dimethylolalkanoic acids (e.g., dimethylolacetic acid, dimethylolbutanoic acid, dimethylolpropionic acid, dimethylolbutyric acid, and dimethylolpentanoic acid). They may be used alone or in combination.

In the production of the polyurethane-based resin, in addition to the above-mentioned components, any other polyol or any other chain extender may be allowed to react. Examples of the other polyol include polyols each having three or more hydroxyl groups, such as sorbitol, 1,2,3,6-hexanetetraol, 1,4-sorbitan, 1,2,4-butanetriol, 1,2,5-pentanetriol, glycerin, trimethylolethane, trimethylolpropane, and pentaerythritol. Examples of the other chain extender include: glycols such as ethylene glycol, diethylene glycol, triethylene glycol, 1,3-propanediol, 1,3-butanediol, 1,4-butanediol, neopentyl glycol, pentanediol, 1,6-hexanediol, and propylene glycol; aliphatic diamines such as ethylenediamine, propylenediamine, hexamethylenediamine, 1,4-butanediamine, and aminoethylethanolamine; alicyclic diamines such as isophoronediamine and 4,4'-dicyclohexylmethanediamine; and aromatic diamines such as xylylenediamine and tolylenediamine.

Any appropriate method is adopted as a method of producing the polyurethane-based resin. Specific examples thereof include a one-shot method involving subjecting the respective components to a reaction at a time, and a multi-stage method involving subjecting the respective components to reactions in stages. When the polyurethane-based resin has a carboxyl group, the multi-stage method is preferred because a carboxyl group can be easily introduced. It should be noted that any appropriate urethane reaction catalyst is used for producing the polyurethane-based resin.

Upon the production of the polyurethane-based resin, a neutralizing agent is preferably used. When the neutralizing agent is used, the stability of the polyurethane-based resin in water can be improved. Examples of the neutralizing agent include ammonia, N-methylmorpholine, triethylamine, dimethylethanolamine, methyldiethanolamine, triethanolamine, morpholine, tripropylamine, ethanolamine, triisopropanolamine, and 2-amino-2-methyl-1-propanol. They may be used alone or in combination.

Upon the production of the polyurethane-based resin, an organic solvent that is inert to the polyisocyanate and is compatible with water is preferably used. Examples of the organic solvent include: ester type solvents such as ethyl acetate, butyl acetate, and ethyl cellosolve acetate; ketone type solvents such as acetone, methyl ethyl ketone, and methyl isobutyl ketone; ether type solvents such as dioxane, tetrahydrofuran, and propylene glycol monomethyl ether. They may be used alone or in combination.

The polyurethane-based resin has a number average molecular weight of preferably 5,000 to 600,000, more preferably 10,000 to 400,000. The polyurethane-based resin has an acid value of preferably 10 or more, more preferably 10 to 50, particularly preferably 20 to 45. When the acid value falls within such range, adhesiveness with an optical member can be more excellent.

The content of the binder resin in the antistatic layer is preferably 50 wt % to 99 wt %, more preferably 70 wt % to 95 wt %.

The antistatic layer is typically formed by applying a resin composition containing the conductive material and the binder resin onto the resin substrate and drying the composition. The resin composition is preferably aqueous. An aqueous resin composition is environmentally excellent and is also excellent in workability as compared to a solvent-based one, and hence can contribute to the simplification of a facility.

The resin composition preferably contains an anionic polymer. The anionic polymer can form a complex with the conductive material. Examples of the anionic polymer include a polycarboxylic acid and a polysulfonic acid. Specific examples of the polycarboxylic acid include polyacrylic acid, polymethacrylic acid, and polymaleic acid. Specific examples of the polysulfonic acid include polystyrene sulfonic acid.

The resin composition preferably contains a cross-linking agent. When the resin composition is cross-linked, water resistance can be imparted to an antistatic layer to be obtained. As a result, for example, the underwater stretching can be satisfactorily performed. Any appropriate cross-linking agent may be adopted as the cross-linking agent. For example, a polymer having a group capable of reacting with a carboxyl group is preferably used as the cross-linking agent. Examples of the group capable of reacting with a carboxyl group include an organic amino group, an oxazoline group, an epoxy group, and a carbodiimide group. The cross-linking agent preferably has an oxazoline group. The cross-linking agent having an oxazoline group has satisfactory workability because it has a long pot life at room temperature when mixed with the urethane resin, and a cross-linking reaction thereof progresses by heating.

Examples of the polymer include an acrylic polymer and a styrene-acrylic polymer. An acrylic polymer is preferred.

When the acrylic polymer is used, the polymer can stably be compatible with the aqueous resin composition, and can be satisfactorily cross-linked with the urethane resin.

The resin composition may further contain any appropriate additive. Examples of the additive include a pH adjustor, a dispersion stabilizer, a thixotropic agent, an antioxidant, a UV absorbing agent, a antifoaming agent, a thickener, a dispersant, a surfactant, a catalyst, a filler, and a lubricant.

As mentioned above, the resin composition is preferably aqueous. The concentration of the binder resin in the resin composition is preferably 1.5 wt % to 15 wt %, more preferably 2 wt % to 10 wt %. The content of the cross-linking agent (solid content) in the resin composition is preferably 1 part by weight to 30 parts by weight, more preferably 3 parts by weight to 20 parts by weight, with respect to 100 parts by weight of the binder resin (solid content). The pH of the resin composition is adjusted to preferably 6 or more, more preferably 7 or more. As the pH adjustor, for example, ammonia is used.

Any appropriate method may be adopted as a method of applying the resin composition. Examples thereof include a bar coating method, a roll coating method, a gravure coating method, a rod coating method, a slot orifice coating method, a curtain coating method, and a fountain coating method. A drying temperature is preferably 50° C. or more, more preferably 60° C. or more. In addition, the drying temperature is preferably Tg+30° C. or less, more preferably Tg or less.

The antistatic layer has preferably been subjected to a stretching treatment. A fine uneven surface including protrusions each having the desired average height and softening temperature can be satisfactorily formed through the stretching treatment. The stretching treatment may also serve as a treatment for forming the PVA-based resin layer into a polarizing film, or may be separately performed. Alternatively, both the treatments may be performed in combination. As described above, by performing the stretching treatment, the fine uneven surface is formed and the conductive material (typically the polythiophene-based polymer) is included at a relatively high concentration in the protrusions in the fine uneven surface. Thus, the softening temperature of each of the protrusions can be made higher. As a result, the laminate can be satisfactorily prevented from adhering to a heating roll at the time of stretching.

Any appropriate method may be adopted as a stretching method in the stretching treatment before the formation of the PVA-based resin layer. Specifically, fixed-end stretching may be adopted, or free-end stretching may be adopted. The stretching may be performed in one stage, or may be performed in a plurality of stages. When the stretching is performed in a plurality of stages, a stretching ratio to be described later is the product of stretching ratios in the respective stages. Further, the stretching mode is not particularly limited, and may be an in-air stretching mode, or may be an underwater stretching mode. The stretching method in the stretching treatment after the formation of the PVA-based resin layer is as described in the section A-3.

Any appropriate direction may be selected as a stretching direction. For example, a long laminate may be stretched in its lengthwise direction (longitudinal direction), may be stretched in a direction (widthwise direction or transverse direction) perpendicular to its lengthwise direction, or may be biaxially stretched in its longitudinal direction and transverse direction. In one embodiment, the stretching is performed in the longitudinal direction before the formation of the PVA-based resin layer. In another embodiment, the stretching is performed in the transverse direction before the formation of the PVA-based resin layer. The stretching is preferably performed in the transverse direction. The stretching is more preferably performed in the longitudinal direction and the transverse direction, i.e., biaxial stretching. The biaxial stretching allows the protrusions to be more satisfactorily formed in the fine uneven surface of the antistatic layer. When the biaxial stretching is performed, it is preferred to perform stretching in the transverse direction before the formation of the PVA-based resin layer and stretching in the longitudinal direction after the formation of the PVA-based resin layer. It should be noted that, according to an embodiment in which a long resin substrate having formed thereon an antistatic layer is stretched in its transverse direction before the formation of the PVA-based resin layer, width shrinkage is promoted when the substrate is stretched in its longitudinal direction afterwards, and for example, the orientation property of a PVA-based resin layer (polarizing film) to be obtained in its longitudinal direction can be improved. Herein, the term "transverse direction" encompasses directions at 85° to 95° counterclockwise with respect to the lengthwise direction.

A stretching temperature may be set to any appropriate value depending on a material for forming the resin substrate, a stretching mode, and the like. The stretching temperature is typically equal to or higher than the glass transition temperature (Tg) of the resin substrate, and is preferably Tg+10° C. or more, more preferably Tg+20° C. or more. When an underwater stretching mode is adopted as the stretching mode and an amorphous polyethylene terephthalate-based resin is used as the material for forming the resin substrate, the stretching temperature can be made lower than the glass transition temperature (e.g., 60° C. to 100° C.) of the resin substrate. When an in-air stretching mode is adopted as the stretching mode and an amorphous polyethylene terephthalate-based resin is used as the material for forming the resin substrate, the stretching temperature is, for example, 70° C. to 130° C.

A stretching ratio may be set to any appropriate value. The stretching ratio is appropriately set depending on, for example, the content of the conductive material and the coating thickness of the resin composition. The stretching ratio is preferably 1.1 times to 20 times, more preferably 1.2 times to 15 times, with respect to the original length of the resin substrate. It should be noted that, unless otherwise mentioned herein, the stretching ratio is a stretching ratio in a longitudinal direction. When biaxial stretching is performed, a stretching ratio in a longitudinal direction is preferably 1.3 times to 10 times, and a stretching ratio in a transverse direction is preferably 1.5 times to 3 times.

A-5. Others

The pressure-sensitive adhesive layer is typically formed of an acrylic pressure-sensitive adhesive. The adhesive layer is typically formed of a PVA-based adhesive. The optically functional film can function as, for example, a protective film for a polarizing film, or a retardation film.

EXAMPLES

Hereinafter, the present invention is specifically described by way of Examples. However, the present invention is not limited to Examples below.

Example 1

A polyethylene terephthalate film (manufactured by Mitsubishi Plastics, Inc., trade name "SH046," Tg: 70° C., thickness: 200 µm) was used as a resin substrate.

5.33 g of an aqueous dispersion of polyurethane having a carboxyl group (manufactured by Dai-ichi Kogyo Seiyaku Co., Ltd., trade name: SUPERFLEX 210, solid content:

33%), 0.59 g of a cross-linking agent (manufactured by NIPPON SHOKUBAI CO., LTD., trade name: EPOCROS WS-700, solid content: 25%), 10.67 g of an aqueous dispersion of poly(3,4-ethylenedioxythiophene) (manufactured by Agfa, trade name: Orgacon LBS, solid content: 1.2%), 0.0356 g of aqueous ammonia having a concentration of 1%, and 23.38 g of water were mixed and stirred to yield a resin composition having a pH of 7.5.

The resultant resin composition was applied with a slot die coater onto one surface of the resin substrate. After that, the resin substrate was placed in a hot-air drying machine (60° C.) for 3 minutes to form an antistatic layer having a thickness of 1 µm.

The resin substrate having formed thereon the antistatic layer was stretched at a ratio of 2 times in a direction perpendicular to its conveyance direction through the use of a tenter in an oven at 90° C. Meanwhile, a PVA aqueous solution having a concentration of 7% was prepared by dissolving PVA powder having a polymerization degree of 4,200 and a saponification degree of 99.2% in water. The PVA aqueous solution was applied onto a surface of the resin substrate opposite to the antistatic layer side in the laminate through the use of a slot die coater, and dried at a temperature of 60° C. to form a PVA-based resin layer having a thickness of 10 µm. Thus, a laminate sample for evaluation was produced.

Example 2

An antistatic layer was formed in the same manner as in Example 1. The resin substrate having formed thereon the antistatic layer was not subjected to tenter stretching, and a PVA-based resin layer was formed in the same manner as in Example 1 on a surface of the resin substrate opposite to the antistatic layer side. A laminate sample for evaluation was produced in the same manner as in Example 1 except that the resin substrate having formed thereon the PVA-based resin layer was subjected to free-end stretching at a ratio of 1.4 times in its conveyance direction in an oven at 90° C.

Example 3

An antistatic layer was formed in the same manner as in Example 1. The resin substrate having formed thereon the antistatic layer was stretched in the same manner as in Example 1, and a PVA-based resin layer was formed in the same manner as in Example 1. The resin substrate having formed thereon the PVA-based resin layer was subjected to free-end stretching at a ratio of 1.4 times in its conveyance direction in an oven at 90° C. Thus, a laminate sample for evaluation was produced.

Comparative Example 1

An antistatic layer was formed in the same manner as in Example 1. The resin substrate having formed thereon the antistatic layer was used as a laminate sample for evaluation without any further treatment.

(Evaluation)

The resin substrate having formed thereon the antistatic layer according to each of Examples and Comparative Example was subjected to the following evaluations.

1. Arithmetic Average Roughness Ra (Unit: Nm)

The surface of the antistatic layer was measured for its arithmetic average roughness (Ra) with an optical 3D profile system (product name: WYKO NT3300) manufactured by Veeco Instruments, Inc. The size of a measurement sample was set to 50 mm×50 mm.

2. Average Height of Each of Protrusions

The average height of protrusions was calculated from the data measured with WYKO in the measurement of the arithmetic average roughness Ra.

3. Softening Temperature

The softening temperature of each of protrusions and recesses in the fine uneven surface of the antistatic layer was measured with a scanning probe microscope (product name: NanoNavi II/E-Sweep/nano-TA2) manufactured by Hitachi High-Tech Science Corporation. The measurement was performed for each of the protrusions and the recesses.

4. Number of Protrusions Per Unit Area

The number of protrusions per unit area was calculated from the data measured with WYKO in the measurement of the arithmetic average roughness Ra.

5. Attachment Test

A laminate sample was attached to an SUS plate (0.25/HCr plating, thickness: 30 µm) heated to a predetermined temperature. In this case, the laminate sample was attached so that its antistatic layer was brought into contact with the SUS plate. After a lapse of 5 seconds from the attachment, the laminate sample was peeled from the SUS plate. The test was performed on the SUS plate at various temperatures, i.e., 80° C., 120° C., and 140° C. The evaluation of adhesion property was performed according to the following criteria.

5: The sample was able to be peeled from the SUS plate without any resistance felt.

4: The sample was able to be peeled from the SUS plate without any problem, although slight resistance was felt.

3: The sample was able to be peeled from the SUS plate, although strong resistance was felt.

2: The sample was able to be peeled from the SUS plate at an acceptable level, although very strong resistance was felt.

1: The sample was stretched and could not be peeled from the SUS plate at all.

TABLE 1

| | Ra (nm) | Average height of protrusions (nm) | Softening temperature (° C.) | | Number of protrusions | Attachment test | | |
| --- | --- | --- | --- | --- | --- | --- | --- | --- |
| | | | Protrusion | Recess | | 80° C. | 120° C. | 140° C. |
| Example 1 | 27 | 50 | 248 | 125 | 160 | 5 | 4 | 3 |
| Example 2 | 21 | 30 | 216 | 139 | 208 | 3 | 2 | 3 |
| Example 3 | 35 | 50 | 232 | 143 | 322 | 5 | 5 | 3 |
| Comparative Example 1 | 8 | 10 | — | 119 | 169 | 1 | 1 | 1 |

As is apparent from Table 1, each of the laminates of Examples of the present invention was remarkably suppressed from adhering to a heating roll as compared to that of Comparative Example. In addition, it was confirmed that each of the laminates of Examples was found to be excellent in blocking resistance and antistatic property and in optical characteristics (polarization degree and transmittance).

According to one embodiment of the present invention, it is possible to provide the laminate that is excellent in blocking resistance and is prevented from adhering to a heating roll by forming, in an antistatic layer, a fine uneven surface including protrusions each having a predetermined height and softening temperature. As a result, the productivity of a polarization film can be markedly improved.

The laminate of the present invention is suitably used for liquid crystal panels of, for example, liquid crystal televisions, liquid crystal displays, cellular phones, digital cameras, video cameras, portable game machines, car navigation systems, copying machines, printers, facsimile machines, clocks, and microwave ovens.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A laminate, comprising:
    a resin substrate;
        a polyvinyl alcohol-based resin layer formed on one side of the resin substrate;
    an antistatic layer formed on another side of the resin substrate and comprising a binder resin and a conductive material,
    wherein the binder resin comprises a polyurethane-based resin and the content of the binder resin in the antistatic layer is 50 wt % to 99 wt %, and the conductive material comprises a conductive polymer comprising a polythiophene-based polymer and the content of the conductive material in the antistatic layer is 1 wt % to 10 wt %,
    wherein the antistatic layer is subjected to at least one stretching treatment selected from the group consisting of stretching in a longitudinal direction and stretching in a transverse direction,
    wherein:
        the antistatic layer has a fine uneven surface; and
        the fine uneven surface comprises protrusions having an average height of 25 nm or more and a softening temperature of 150° C. or more.

2. A laminate according to claim 1, wherein a difference between the softening temperature of the protrusions in the surface of the antistatic layer and a softening temperature of each of portions except for the protrusions in the surface is 70° C. or more.

3. A laminate according to claim 1, wherein the antistatic layer has an arithmetic average surface roughness Ra of 18 nm or more.

4. A laminate according to claim 1, wherein the antistatic layer has a surface resistance value of less than $10 \times 10^{13} \Omega/\square$.

5. A laminate according to claim 1, wherein the antistatic layer has an arithmetic average surface roughness Ra of 18 nm or more and has a surface resistance value of less than $10 \times 10^{13} \Omega/\square$, and a difference between the softening temperature of the protrusions in the surface of the antistatic layer and a softening temperature of each of portions except for the protrusions in the surface is 70° C. or more.

* * * * *